United States Patent
Tassakos

(10) Patent No.: US 6,446,349 B1
(45) Date of Patent: Sep. 10, 2002

(54) METHOD AND DEVICE FOR SPATIAL POSITIONING AND ALIGNMENT OF A BALL AND SOCKET JOINT

(76) Inventor: Charalambos Tassakos, Drischerstrasse 66, D-52146 Würselen (DE)

(*) Notice: Subject to any disclaimer, the term of this patent is extended or adjusted under 35 U.S.C. 154(b) by 0 days.

(21) Appl. No.: 09/552,598

(22) Filed: Apr. 19, 2000

(30) Foreign Application Priority Data

Apr. 20, 1999 (DE) .......................................... 199 17 729

(51) Int. Cl.[7] .............................................. G01B 5/004
(52) U.S. Cl. .............................. 33/645; 33/613; 403/90
(58) Field of Search ................................ 33/645, 1 CC, 33/1 MP, 286, 533, 613, 502, 503; 403/76, 90, 122

(56) References Cited

U.S. PATENT DOCUMENTS

| | | | | |
|---|---|---|---|---|
| 2,411,621 A | * | 11/1946 | Grubbs .......................... | 33/645 |
| 2,731,712 A | * | 1/1956 | Laux ............................ | 33/645 |
| 4,140,413 A | * | 2/1979 | Conrad ......................... | 403/90 |
| 4,528,757 A | * | 7/1985 | McKeehan et al. ............ | 33/645 |
| 5,383,738 A | * | 1/1995 | Herbermann ................. | 403/90 |

\* cited by examiner

*Primary Examiner*—Christopher W. Fulton
(74) *Attorney, Agent, or Firm*—Paul Vincent

(57) ABSTRACT

The invention concerns a method and a device for spatial positioning and alignment of a two-part ball and socket joint (2) comprising a socket (3) as a first part and a solid ball (4) as a second part which is received in the socket (3) such that it can be turned and pivoted. For exact, definite and reproducible spatial positioning and alignment of the ball and socket joint (2) the invention proposes defining a virtual plane on one part (3; 4) of the ball and socket joint (2) which extends through the center (22) of the solid ball (4) of the ball and socket joint (2); defining two positioning points (23, 24), separated from one another and from the center (22) of the solid ball (4), on the virtual plane; defining a further virtual plane on the other part (4, 3) of the ball and socket joint (2); defining two reference points (25, 26) on the further virtual plane at a separation from one another and at a separation from the center (22) of the solid ball (4); positioning and aligning the further virtual plane in three-dimensional space; and moving the positioning points (23, 24) relative to the reference points (25, 26) at predetermined positioning separations.

17 Claims, 3 Drawing Sheets

METHOD AND DEVICE FOR SPATIAL POSITIONING AND ALIGNMENT OF A BALL AND SOCKET JOINT

BACKGROUND OF THE INVENTION

The present invention concerns a method for spatial positioning and alignment of a two-piece ball and socket joint comprising a socket as a first part and a solid ball as a second part received in the socket in a rotatable and pivotable fashion.

The invention also concerns a device for spatial positioning and alignment of a two-piece ball and socket joint comprising a socket as a first part and a solid ball as a second part received in the socket in a rotatable and pivotable fashion.

Ball and socket joints are conventionally used for holding devices, wherein part of the ball and socket joint is mounted e.g. to a stand or a wall holder. A unit is disposed on the other part of the ball and socket joint. The unit is e.g. a gripping unit, an illumination unit or an optical image detection unit. The ball and socket joint permits alignment of the unit within a Cartesian coordinate system in the x, y and z direction and rotation about the x, y and z-axis. The ball and socket joint permits alignment of the unit in almost any direction in three-dimensional space.

The ball and socket joints of holding devices often comprise holding means which act on the socket and can alter the circumference of the socket. The socket can e.g. thereby comprise a gap at the circumference which can be increased or reduced in size by means of a screw element. The maximum circumference of the socket changes in dependence on the size of the gap. When the gap is minimized, the circumference of the socket can be reduced to such an extent that the solid ball can no longer freely pivot and rotate in the socket but is held therein. The holding means permit rapid and simple fixing of the unit mounted to the holding device at arbitrary orientations.

Conventional holding devices comprise, in addition to the ball and socket joint, a plurality of further joints, e.g. swivel joints, rectilinear sliding pairs or further ball and socket joints. These further joints permit positioning of the ball and socket joint, mounted to the holding means, and the unit mounted to the ball and socket joint, into nearly any arbitrary position.

A substantial problem associated with the conventional holding devices is bringing the unit, mounted to the holding device, into a predetermined position and alignment in three-dimensional space. In particular, spatial alignment of the ball and socket joint of the holding device is problematic. Towards this end, a virtual plane is defined on one part of the ball and socket joint. Three positioning points are defined at a separation from one another on this virtual plane. By positioning the three positioning points in three-dimensional space, the virtual plane and therefore also the ball and socket joint can be spatially positioned and aligned. According to prior art, this requires substantial effort (e.g. aiming at the three positioning points using a laser beam) to position the three positioning points with high accuracy in three-dimensional space.

It is therefore the underlying purpose of the present invention to design and further develop a method of the above-mentioned kind such that a ball and socket joint can be spatially positioned and aligned in a rapid, easy and highly accurate fashion.

SUMMARY OF THE INVENTION

To achieve this object, the invention, departing from the above-mentioned method, proposes a method which is characterized by the following steps:

a virtual plane is defined on one part of the ball and socket joint which extends through the center of the solid ball of the ball and socket joint;

two positioning points are defined on the virtual plane at a separation from one another and at a separation from the center of the solid ball;

a further virtual plane is defined on the other part of the ball and socket joint;

two reference points are defined on a further virtual plane at a separation from one another and at a separation from the center of the solid ball;

the further virtual plane is positioned and aligned in three-dimensional space; and the positioning points are moved to the reference points at predetermined positioning separations.

A unit is preferably disposed on part of the ball and socket joint, on the solid ball or on the socket, which is formed e.g. as gripping unit, illumination unit or optical image detection unit. The other part of the ball and socket joint is preferably mounted to a holding means, e.g. a stand or a wall holder. To enable mounting of the unit at a certain position and alignment in three-dimensional space, the ball and socket joint has to be brought into a certain spatial position and alignment.

In the method in accordance with the invention, a virtual plane is defined on a part of the ball and socket joint, the solid ball or the socket of the ball and socket joint, which extends through the center of the solid ball of the ball and socket joint. The virtual plane is preferably defined on that part of the ball and socket joint where the unit, e.g. a gripping unit, an illumination unit or an optical image detection unit is disposed. To enable positioning and alignment of this virtual plane in three-dimensional space, three positioning points have to be defined and spatially positioned in the virtual plane. The center of the solid ball is selected to be one of the three positioning points in the virtual plane. The center of the solid ball always remains at the same position, independent of the alignment of the ball and socket joint. This permits exact alignment of the virtual plane in three-dimensional space merely by positioning two positioning points. In the inventive method, the ball and socket joint can therefore be exactly and uniquely aligned in three-dimensional space by positioning two positioning points.

A further virtual plane is defined on the other part of the ball and socket joint, on the socket or the solid ball. The further virtual plane is preferably defined on that part of the ball and socket joint where the ball and socket joint is mounted to the holding device. In addition to the ball and socket joint, the holding device preferably comprises a plurality of further joints, e.g. swivel joints or rectilinear sliding pairs. The ball and socket joint can be brought into almost any position through these further joints. The further virtual plane is positioned and aligned in three-dimensional space by corresponding adjustment of the further joints of the holding device. Prior art discloses a plurality of different methods therefor. The position of the ball and socket joint in three-dimensional space is exactly fixed through the spatially positioned and aligned further virtual plane.

The ball and socket joint must be aligned in three-dimensional space. Towards this end, in accordance with the inventive method, the virtual plane is aligned on the one part of the ball and socket joint relative to the further virtual plane on the other part of the ball and socket joint. Two reference points are defined on the further virtual plane. The positioning points on the virtual plane are brought to predetermined positioning separations from the reference points. Since the further virtual plane is exactly positioned and aligned in three-dimensional space, the virtual plane which is aligned relative to the further virtual plane is spatially positioned and aligned with high accuracy.

The positioning separations can be set optically, electronically and/or mechanically. The separation between the center of the solid ball and a third reference point of the further virtual plane always remains constant relative to the further virtual plane irrespective of the alignment of the virtual plane. Unique alignment of the virtual plane relative to the further virtual plane generally requires specifying the values of at least three different positioning separations between the positioning points and the reference points.

To bring a ball and socket joint into a desired position and alignment in three-dimensional space, the further virtual plane must initially be positioned and aligned according to predetermined values in three-dimensional space. The virtual plane is then aligned relative to the further virtual plane by setting the positioning separations between two positioning points on the virtual plane and two reference points on the further virtual plane to predetermined values. The inventive method permits easy and highly accurate positioning and alignment of a ball and socket joint in three-dimensional space.

An advantageous further development of the present invention suggests setting the positioning separations using positioning bars extending through the reference points. In this further development, the positioning separations are measured mechanically. It is feasible to provide several positioning bars whose lengths correspond to the predetermined positioning separations. The positioning bars can then be adjusted at the predetermined positions between the positioning points and the reference points.

A further advantageous development of the invention suggests longitudinal displacement of the positioning bars relative to the further virtual plane such that the separation between the reference points on the virtual plane and the distal ends of the positioning bars are set to the positioning separations. The lengths of the positioning bars can preferably be fixed to the values of the positioning separations. The positioning points on the virtual plane are moved such that they coincide with the distal ends of the positioning bars. In this fashion, the ball and socket joint can be variably positioned and aligned.

A preferred embodiment of the present invention suggests adjustment of the positioning separations by means of two positioning bars extending perpendicular to the further virtual plane. Through this limitation of the general case, the values of two different positioning separations between the positioning points and the reference points are sufficient for unique alignment of the virtual plane relative to the further virtual plane.

Advantageously, the virtual plane and the further virtual plane are defined on the parts of the ball and socket joint such that they extend approximately parallel to one another in a preferred alignment region of the ball and socket joint, wherein the separation between the positioning points is selected to be approximately identical with the separation between the reference points.

A further object of the present invention consists in devising and further developing a device of the initially mentioned kind such that a ball and socket joint can be spatially positioned and aligned in a fast, simple and highly accurate fashion by means of the device.

To achieve this object, the invention suggests, departing from a device of the above-mentioned kind, that the device comprises means for carrying out the method in accordance with the invention.

In a preferred further development of the present invention, the device comprises a reference part mounted to a part of the ball and socket joint, and a positioning part mounted to the other part of the ball and socket joint, wherein the positioning part lies in a virtual plane which extends through the center of the solid ball of the ball and socket joint;

two positioning points are defined on the virtual plane at a separation from one another and at a separation from the center of the solid ball;

the reference part lies in a further virtual plane positioned and aligned in three-dimensional space;

two reference points are defined on the further virtual plane at a separation from one another and at a separation from the center of the solid ball; and the positioning separations can be set to predetermined values between the positioning points and the reference points.

The reference part is positioned and aligned in three-dimensional space. The ball and socket joint is thereby exactly and uniquely positioned in three-dimensional space. The positioning points of the positioning part are brought to a predetermined positioning separation from the reference points of the reference part. This effects exact and unique alignment of the positioning part relative to the reference part. The inventive device can therefore bring the ball and socket joint to a predetermined spatial position and alignment in a simple fashion. The predetermined values for the position and alignment of the reference part in three-dimensional space and the predetermined values for the positioning separations permit reproduction of the predetermined position and alignment of the ball and socket joint any number of times.

Advantageously, the positioning part and the reference part are mounted to the parts of the ball and socket joint in such a fashion that the virtual plane and the further virtual plane extend approximately parallel to one another in a preferred orientation region of the ball and socket joint, wherein the separation between the positioning points is approximately equal to the separation between the reference points.

In a preferred embodiment of the invention, the reference part comprises positioning bars for adjusting the positioning separations, wherein the positioning bars extend through the reference points. The positioning bars have e.g. lengths which correspond to the positioning separations. The positioning bars can be fitted between the positioning points and the reference points at the predetermined positions. In general, at least three positioning bars are required for adjusting three different positioning separations between the positioning points and the reference points to enable unique alignment of the positioning part relative to the reference part.

Advantageously, the device comprises means for fixing the positioning separations to the predetermined values. The positioning bars can be adjustable in length and can be fixed by these means to the predetermined values of the positioning separations. In this fashion, the positioning part can be variably aligned relative to the reference part.

A preferred embodiment of the present invention suggests that the positioning bars comprise a ruling for setting the positioning separations. By means of the ruling, the lengths of the positioning bars can be set to the predetermined values of the positioning separations in a particularly simple fashion.

In a particularly preferred embodiment of the invention, the reference part comprises two positioning bars for setting the positioning separations, wherein the positioning bars extend perpendicular to the further virtual plane. Through this limitation of the general case, two positioning bars are sufficient for unique alignment of the positioning part relative to the reference part.

Advantageously, the positioning part comprises support surfaces for the distal ends of the positioning bars in the area of the positioning points. The support surfaces are disposed on the virtual plane in which the positioning part is disposed. The positioning separations are the separations between the reference points of the reference part and the distal ends of the positioning bars.

The positioning part preferably comprises one support surface in the region of each positioning point. If only two positioning bars are used, the lengths of the positioning bars are first set to the values of the positioning separations. The support surfaces of the positioning part are then moved to rest on the distal end of one of the positioning bars. The positioning part is thereby aligned relative to the reference part and the ball and socket joint is brought into unique position and alignment in three-dimensional space.

A preferred embodiment of the invention suggests that at least one of the support surfaces comprises means for positioning the distal end of one of the positioning bars relative to the support surface. Advantageously, the means for positioning the distal end of one of the positioning bars are formed as a depression in the support surface. The depression is preferably formed as a groove.

A preferred embodiment of the present invention is described in detail below with reference to the drawings.

DESCRIPTION OF THE PREFERRED EMBODIMENT

Figure 1:
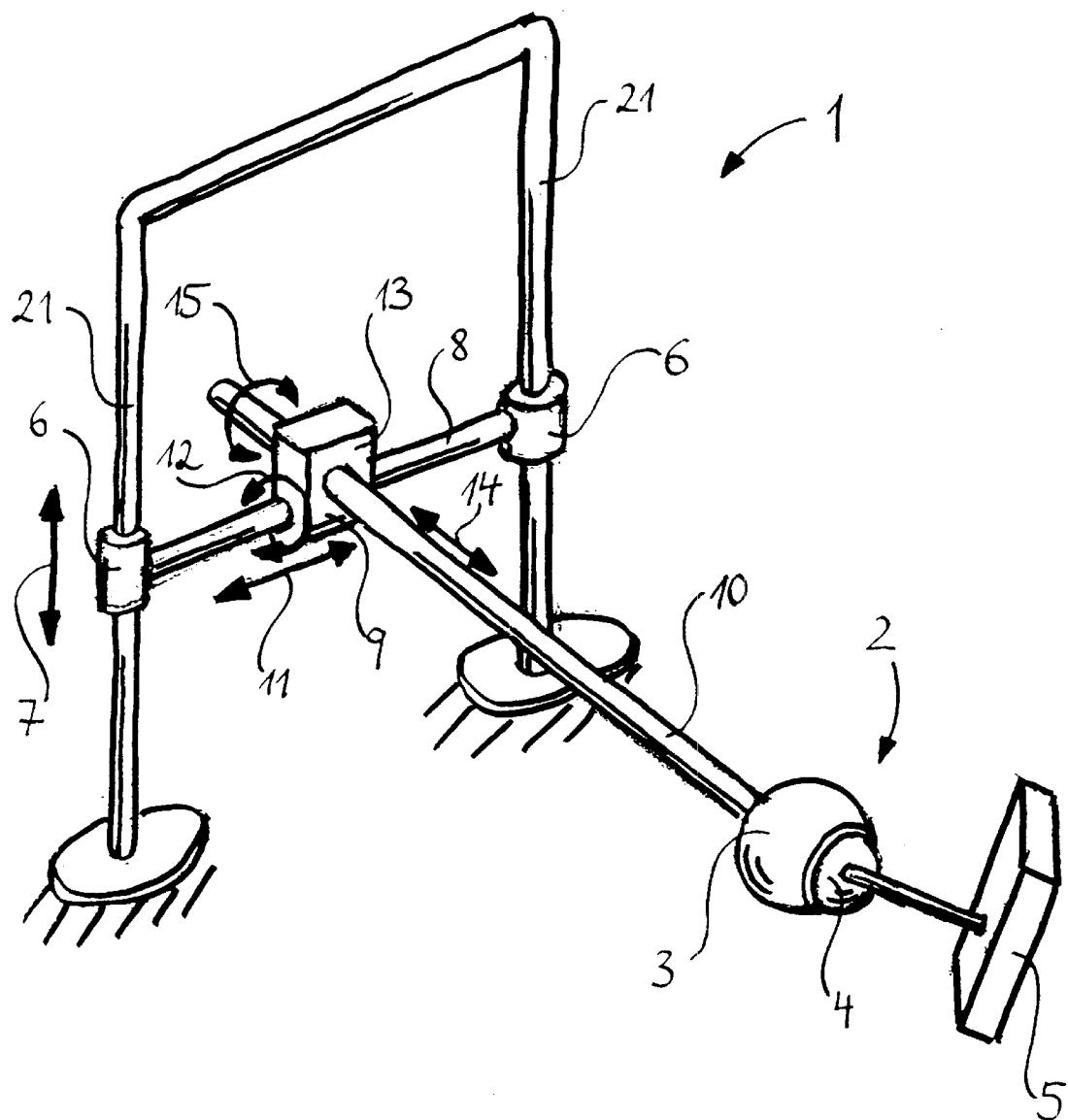
FIG. 1 shows a holding device to which a ball and socket joint is mounted.

FIG. 1 shows a holding device designated in its totality with reference numeral 1. The holding device 1 is formed as a stand which is anchored in the supporting structure. The holding device 1 comprises a ball and socket joint 2. The ball and socket joint 2 comprises a socket 3 as a first part and a solid ball 4 as a second part received therein in a rotatable and pivotable fashion. The ball and socket joint 2 is mounted via the socket 3 to the holding device 1. A unit 5 is fastened to the solid ball 4. The unit 5 is e.g. a gripping unit, an illumination unit or an optical image detection unit. The unit 5 can be adjusted via the ball and socket joint in a Cartesian coordinate system in the x, y and z directions and can be turned about the x, y and z axes. The ball and socket joint 2 therefore has six degrees of freedom. The ball and socket joint 2 facilitates largely arbitrary alignment of the unit 5 in three-dimensional space.

The ball and socket joint 2 comprises holding means which act on the socket 3 to vary the circumference thereof. In the present embodiment, the socket 3 comprises a gap at the circumference which is increased or reduced in size by a screw element. Depending on the width of the gap, the maximum circumference of the socket 3 changes. The width of the gap and therefore the circumference of the socket 3 can be reduced to a sufficient extent that the solid ball 4 in the socket 3 can no longer be freely displaced and rotated but is held therein. The unit 5, mounted to the holding device 1, can be rapidly and simply fixed in any orientation by the holding means 1.

The holding device 1 comprises, in addition to the ball and socket joint 2, a plurality of further joints 6, 9, 13 by means of which the ball and socket joint 2, mounted to the holding device 1, and therefore also the unit 5, mounted to the ball and socket joint 2, can be brought into almost any arbitrary position. The height of a transverse bar 8 can be adjusted on vertical guiding bars 21 of the holding device 1 in the direction of the arrow 7 by means of a rectilinear sliding pair 6. Transverse adjustment of a lever arm 10 of the holding device 1 in the direction of the arrow 11 on the transverse bar 8 is possible by means of a first rotary rectilinear sliding pair 9 and can be turned in the direction of the arrow 12 on the transverse bar 8. Using a second rotary rectilinear sliding pair 13, the lever arm 10 can be longitudinally displaced in the direction of the arrow 14 and turned in the direction of the arrow 15. Adjustment of the joints 6, 9, 13 is carried out continuously or discretely. The joints 6, 9, 13 are fixed in the desired adjustment position of the holding device 1 by suitable holding means. The unit 5 can be positioned and aligned to nearly any position in three-dimensional space by the holding device 1 and the ball and socket joint 2.

Prior art discloses a plurality of devices and methods for bringing the further joints 6, 9, 13 into a predetermined position, and thereby the ball and socket joint 2, mounted to the end of the lever arm 10, into a predetermined position. For example, the positions of the joints 6, 9, 13 can be adjusted using rulings on the guiding bars 8, 10, 21. The displacement paths of the joints 6, 9, 13 can be read from the rulings.

Figure 2:
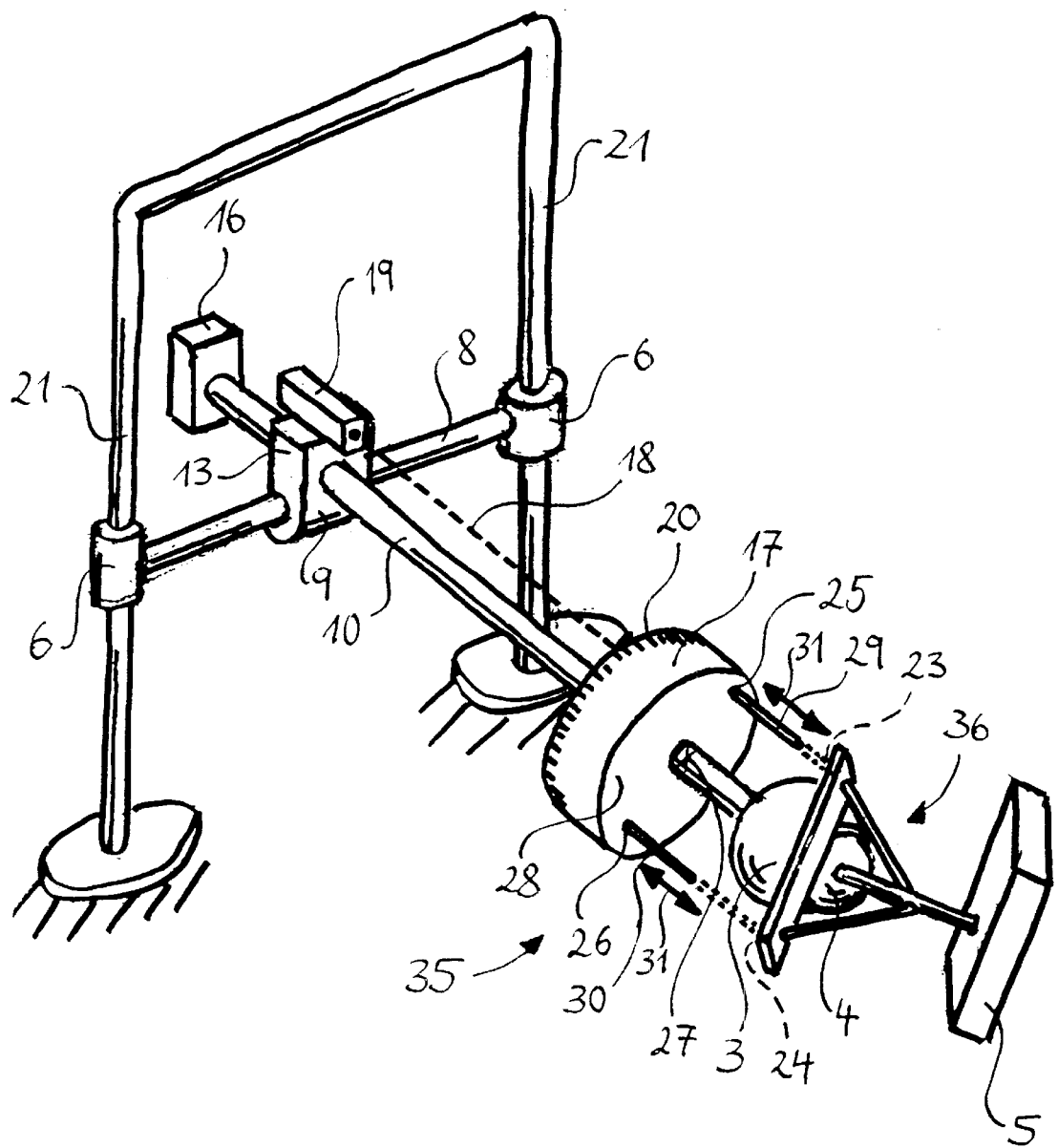
FIG. 2 shows the holding device of FIG. 1 with a reference part of the inventive device.

The embodiment of FIG. 2 uses an inclination sensor 16 for setting the rotary angle of the lever arm 10 about the transverse bar 8 in the direction of the arrow 12. For setting the rotary angle of the lever arm 10 in the direction of the arrow 15, a graduated disk 17 is mounted on the lever arm 10 in a defined rotary position. A laser beam 18 emitted by a laser 19 disposed on the joints 9, 13 points to a ruling 20 on the graduated disk 17. The lever arm 10 is rotated with the graduated disk 17 in the direction of the arrow 15 until the laser beam 18 points to a predetermined angular value on the ruling 20 of the graduated disk 17.

Figure 3:
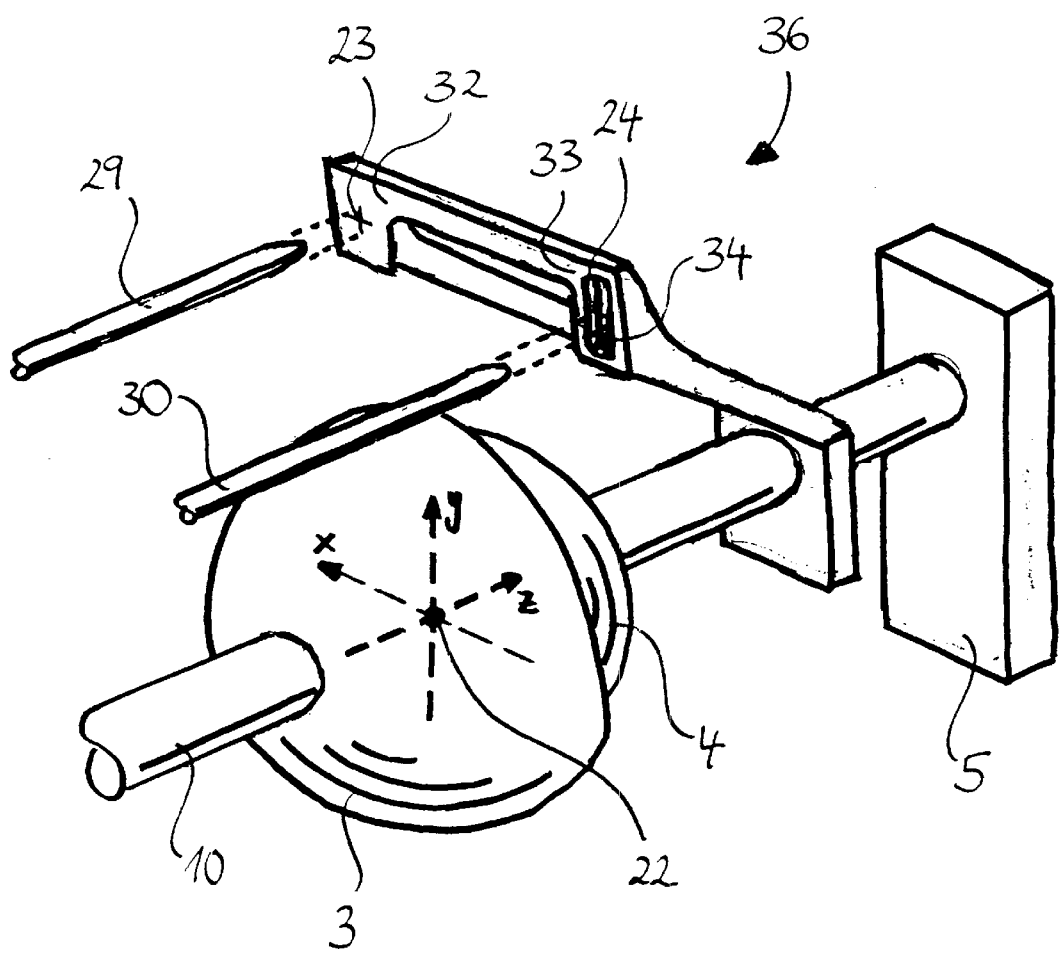
FIG. 3 shows a section of the ball and socket joint of the holding device of FIG. 2 with a positioning part of the device in accordance with the invention.

This effects spatial positioning of the ball and socket joint 2 and thereby also of the unit 5 mounted to the solid ball 4 of the ball and socket joint 2. A particular problem, however, exists in spatial alignment of the ball and socket joint 2 of the holding device 1 and thereby of the unit 5. In general, a virtual plane is defined for alignment of the ball and socket joint 2 in three-dimensional space on the solid ball 4 of the ball and socket joint 2. Three positioning points 22, 23, 24 are determined on this virtual plane at a separation from one another (see FIG. 3). The virtual plane and thereby also the ball and socket joint 2 can be spatially positioned and aligned by positioning the three positioning points 22, 23, 24 in three-dimensional space.

In the inventive method of spatial alignment and positioning of the ball and socket joint 2, a further virtual plane is defined on the socket 3 of the ball and socket joint 2 (see FIG. 2). The further virtual plane is positioned and aligned in three-dimensional space by adjustment of the further joints 6, 9, 13. The virtual plane is then aligned relative to the further virtual plane by twisting and pivoting the ball and socket joint 2. Towards this end, three reference points 25, 26, 27 are defined on the further virtual plane and the positioning points 22, 23, 24 are brought into predetermined positioning separations from the reference points 25, 26, 27 on the further plane.

The virtual plane is defined on the solid ball 4 in such a manner that it extends through the center 22 of the solid ball 4 of the ball and socket joint 2. The further virtual plane lies in an end face 28 of the graduated disk 17. The positioning separation between the center 22 of the solid ball 4 and any reference point 25, 26, 27 on the further virtual plane always remains constant, independent of the alignment of the ball and socket joint 2. A setting of the positioning separations between the two positioning points 23, 24 and the two reference points 25, 26 to predetermined values is therefore sufficient for unique alignment of the virtual plane relative to the further virtual plane.

The positioning separations between the reference points 25, 26 and the positioning points 23, 24 are set by means of two positioning bars 29, 30. The positioning bars 29, 30 extend perpendicularly with respect to the end face 28 of the graduated disk 17 and therefore perpendicular to the further virtual plane. The positioning bars 29, 30 are disposed for displacement in the graduated disk 17 in the direction of arrows 31.

For alignment of the ball and socket joint 2, the positioning bars 29, 30 are set to predetermined values for the positioning separations. The positioning points 23, 24 are then supported on the distal ends of the positioning bars 29, 30 (see dashed lines in FIG. 3). The distal ends of the positioning bars 29, 30 then coincide with the positioning points 23, 24. The ball and socket joint 2 is fixed in this orientation. The ball and socket joint 2 can be easily aligned precisely, uniquely and reproducibly in three-dimensional space and can be positioned and aligned in three-dimensional space by means of the two positioning bars 29, 30.

The virtual plane and the further virtual plane are defined on the solid ball 4 or the socket 3 of the ball and socket joint 2 such that they extend approximately parallel to one another in a preferred orientation region of the ball and socket joint 2. The separation between the positioning points 23, 24 is approximately identical to the separation between the reference points 25, 26.

The device for aligning the ball and socket joint 2 comprises a reference part 35, mounted to the socket 3 of the ball and socket joint 2, and a positioning part 36 mounted to the solid ball 4 of the ball and socket joint 2. In the present embodiment, the reference part 35 is formed substantially by the end face 28 of the graduated disk 17, the reference points 25, 26 and the positioning bars 29, 30. The positioning part 36 comprises two support surfaces 32, 33 disposed in the virtual plane on which the positioning points 23, 24 are defined. The support surface 33 comprises a groove 34 for receiving and positioning the distal end of the positioning bar 30 relative to the support surface 33.

In summary, positioning and alignment of the ball and socket joint 2 in accordance with the present invention relies essentially on a so-called 3-2-1 bearing of the virtual plane. With this 3-2-1 bearing, three degrees of freedom of the six degrees of freedom of the ball and socket joint 2 are fixed by the solid ball 4. Two degrees of freedom are fixed by the groove 34 receiving the distal end of the positioning bar 30 and one degree of freedom is fixed by the support surface 32 on which the distal end of the positioning bar 29 is supported. The 3-2-1 bearing thereby effects unique positioning and alignment of the virtual plane, and therefore also of the ball and socket joint 2, in three-dimensional space.

I claim:

1. A method for spatial positioning and alignment of a two-piece ball and socket joint comprising a socket as a first part and a solid ball as a second part, the solid ball being received in the socket such that it can be turned and pivoted, the method comprising the steps of:

a) defining a first virtual plane, on a first part of said ball and socket joint, which extends through a center of said solid ball of said ball and socket joint;

b) defining two positioning points on said first virtual plane at a separation from one another and at a separation from said center of said solid ball;

c) defining a second virtual plane on a part of said ball and socket joint;

d) defining two reference points on said second virtual plane at a separation from one another and at a separation from said center of said solid ball;

e) positioning and aligning said second virtual plane in three-dimensional space; and f) moving said two positioning points into predetermined positioning separations from said two reference points.

2. The method of claim 1, wherein step f) comprises the step of setting said positioning separations by means of positioning bars extending through said two reference points.

3. The method of claim 2, wherein said positioning bars are displaced in a longitudinal direction relative to said second virtual plane such that separations between said two reference points and distal ends of said positioning bars are set to said positioning separations.

4. The method of claim 2, wherein said two positioning bars extend perpendicular to said second virtual plane.

5. The method of claim 1, wherein said first virtual plane and said second virtual plane extend approximately parallel to one another in a preferred alignment region of said ball and socket joint, wherein said separation between said two positioning points is selected to be approximately equal to said separation between said two reference points.

6. A device for spatial positioning and alignment of a two-piece ball and socket joint comprising a socket as a first part and a solid ball as a second part, the solid ball being received in the socket such that it can be turned and pivoted, the device comprising:

means for defining a first virtual plane, on a first part of said ball and socket joint, which extends through a center of said solid ball of said ball and socket joint;

means for defining two positioning points on said first virtual plane at a separation from one another and at a separation from said center of said solid ball;

means for defining a second virtual plane on a part of said ball and socket joint;

means for defining two reference points on said second virtual plane at a separation from one another and at a separation from said center of said solid ball;

means for positioning and aligning said second virtual plane in three-dimensional space; and means for moving said two positioning points into predetermined positioning separations from said two reference points.

7. The device of claim 6, wherein a reference member, mounted to a one part of said ball and socket joint, defines said second virtual plane and a positioning member, mounted to another part of said ball and socket joint defines said first virtual plane, wherein said positioning member lies in said first virtual plane, and said reference member lies in said second virtual plane.

8. The device of claim 7, wherein said first virtual plane and said second virtual plane extend approximately parallel to one another in a preferred orientation region of said ball and socket joint and wherein said separation between said two positioning points is approximately equal to said separation between said two reference points.

9. The device of claim 7, wherein at least one of said reference member and said positioning member comprises means for fixing said positioning separations to predetermined values.

10. The device of claim 7, wherein said reference member comprises positioning bars for setting said positioning separations, wherein said positioning bars extend through said two reference points.

11. The device of claim 10, wherein said positioning bars have a ruling for setting said positioning separations.

12. The device of claim 10, wherein there are two positioning bars, each of said two positioning bars extending perpendicularly to said second virtual plane.

13. The device of claim 10, wherein said positioning member has support surfaces for distal ends of said positioning bars in a region of said two positioning points.

14. The device of claim 13, wherein said positioning member has a support surface in each region of said two positioning points.

15. The device of claim 14, wherein at least one of said support surfaces comprises means for positioning a distal end of one of said positioning bars relative to that support surface.

16. The device of claim 15, wherein said means for positioning said distal end of one of said positioning bars are formed as a depression in that support surface.

17. The device of claim 16, wherein said depression is formed as a groove.

* * * * *